H. B. PROSSER.
MOLD.
APPLICATION FILED JULY 22, 1912.

1,090,566.

Patented Mar. 17, 1914.
2 SHEETS—SHEET 1.

Witnesses
Robert H. Weir
Arthur Carlson

Inventor
Henry B. Prosser.
by Free Bain & May
Attys.

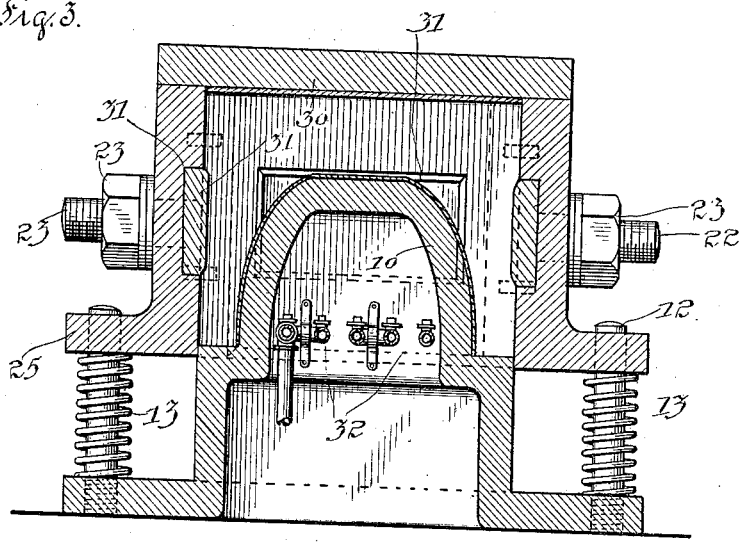
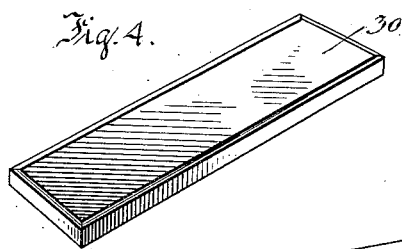
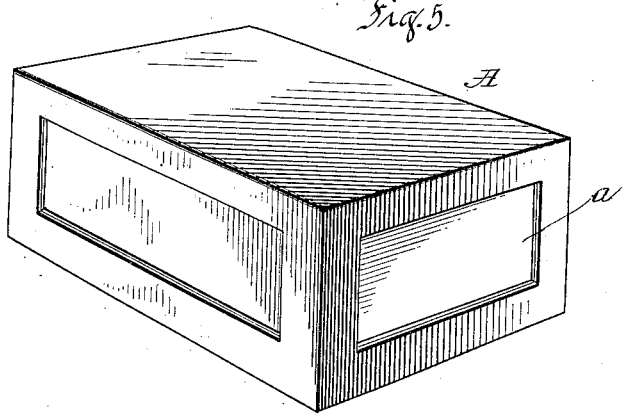

UNITED STATES PATENT OFFICE.

HENRY B. PROSSER, OF CHICAGO, ILLINOIS, ASSIGNOR TO ADVANCE TERRA COTTA COMPANY, OF CHICAGO, ILLINOIS, A CORPORATION OF ILLINOIS.

MOLD.

1,090,566.  Specification of Letters Patent.  Patented Mar. 17, 1914.

Application filed July 22, 1912. Serial No. 710,874.

*To all whom it may concern:*

Be it known that I, HENRY B. PROSSER, a citizen of the United States, residing at Chicago, in the county of Cook and State of Illinois, have invented certain new and useful Improvements in Molds, of which the following is a specification.

My invention relates to improvements in molds, and particularly molds for making plastic building blocks of terra-cotta and the like, wherein the material to be molded is subjected to pressure rather than impact, to insure its proper distribution and compression in the mold.

One of the salient objects of my invention is to provide a compressible mold which is simple, cheap and efficient, insuring by its operation a proper and uniform distribution of materials in the molding operation and facilitating the handling of the molded parts.

Another object of my invention is to provide a mold especially adapted to the formation of hollow blocks having recesses or rabbets in their side surfaces, and one especially adapted for handling clay products.

Other and further objects of my invention will become apparent to those skilled in the art from the following description taken in conjunction with the accompanying drawings wherein I have illustrated an embodiment of my invention.

Figure 1:
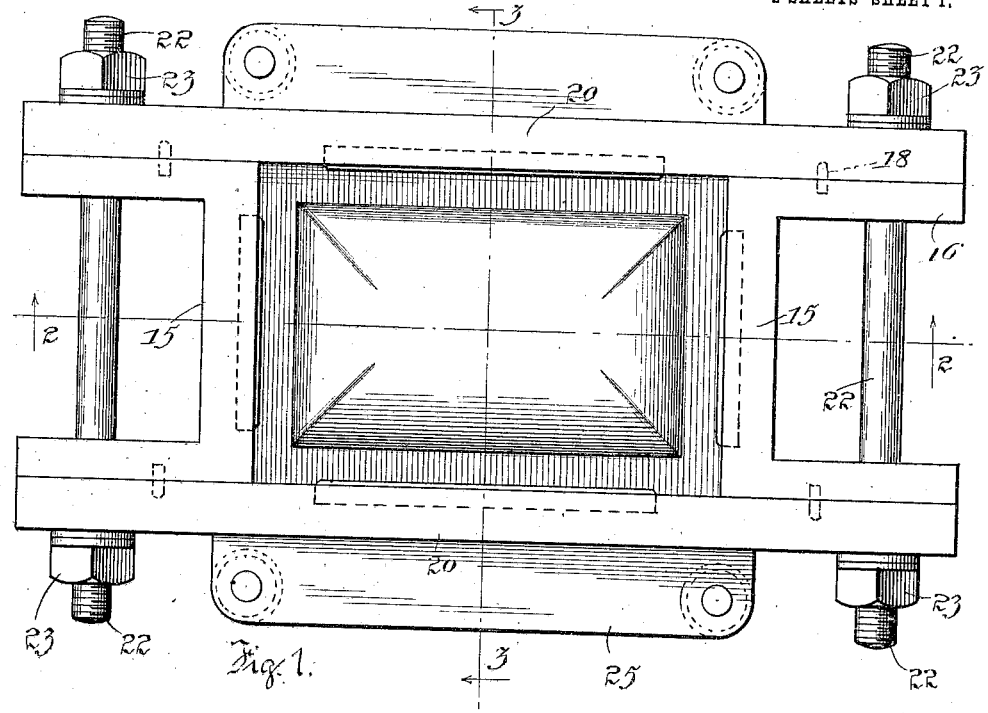
Figure 2:
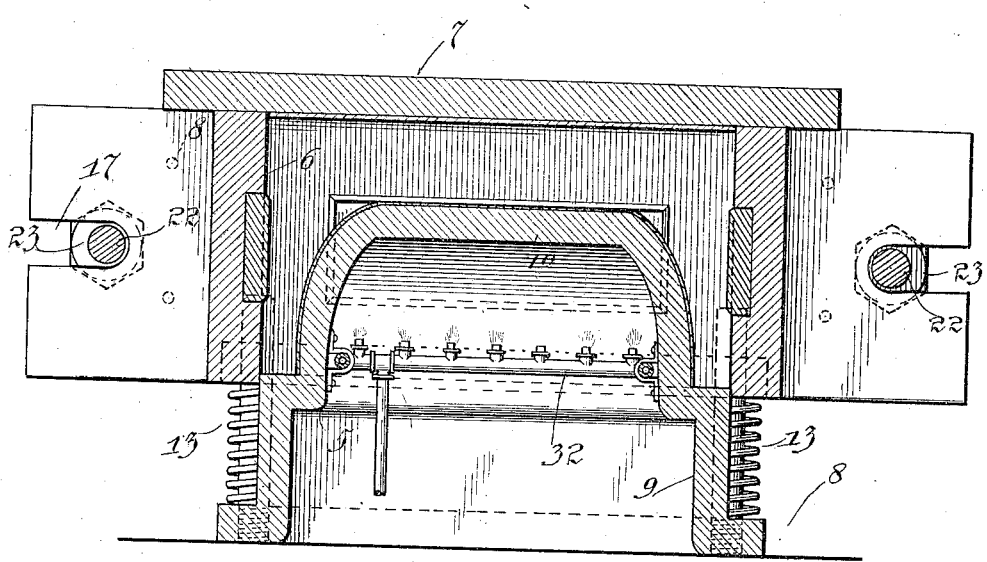

In the drawings Figure 1 is a plan view of a mold embodying my invention with the cover removed; Fig. 2 is a central longitudinal section taken on line 2—2 of Fig. 1. Fig. 3 is a transverse vertical section on line 3—3 of Fig. 1; Fig. 4 is a perspective detail of a rabbet-forming insert and Fig. 5 is a perspective detail of a completed block.

The mold herein shown consists in general of a base member 5, a body 6, and a cover 7, the body being yieldingly mounted on the base to move relative thereto for compression of the mold-contained material when under pressure.

The base 5, which may conveniently be made of metal, in the form shown consists of a base plate 8 suitable to be supported on a flat surface of a press not shown, hollow rectangular box or head 9 rising above the plate 8, and a boss or dome 10 of suitable size and shape rising above the otherwise flat top surface of the box 9. The base plate 8 extends laterally beyond the box 9 a suitable distance and carries four vertical guide rods 12 each surrounded by a compressible spring 13.

The body 6 comprises a pair of end pieces 15 each having at its extremities outwardly extending parallel flanges 16 slotted as at 17 and provided with laterally projecting dowel pins 18. With these end members coöperate side plates 20—20 each having holes to interfit with the dowel pins 18 and flat ends slotted to conform with the slots 17 to receive the tension rods 22 carrying nut 23—23 which when tightened bind the side members and the end members firmly together. Each side member 20 has a flange 25 extending horizontally from its lower edge and provided with suitable apertures to be engaged for guidance with the guide posts 12 as best indicated in Fig. 3, the flanges 25 resting on the springs 13 which act to define the normal position of the body. The mold body is of such dimension that it may neatly telescope with the box 9 of the base member and may be forced downward upon said base member against the tension of the spring 13 when placed under pressure in a suitable press.

The top plate 7 is a flat plate adapted for coöperation with the appropriate press surface.

In the manufacture of terra-cotta blocks it is advantageous to form in each side surface of the block a recess or rabbet surrounded by an uninterrupted border, and for the formation of such a recess I provide in each of the members of the mold body a removable insert 30 preferably made of a moisture absorbent material such as plaster of Paris. To this end the inner surface of each body member is provided with a recess 31 in which is seated a panel 30 of plaster of Paris, or the like, neatly interfitting therein and protruding a suitable distance into the interior area of the body so that each block A made by the mold will have its side surfaces recessed or rabbeted as at *a*. (See Fig. 5). The use of a panel of an absorbent material in the rabbet insert is advantageous in that any superfluous moisture of the plastic material introduced into the mold may be absorbed as the material is being condensed or compacted under pressure; and the absorbent nature of the plaster of Paris prevents the clay from adhering unduly thereto.

To insure that the molded block when green, may readily be separated from the protruding dome 10 which forms the hollow in the rear face of the block, I preferably provide a cover 31 of cloth or the like for the face of the boss which is exposed to the interior of the mold, so that air may not be wholly excluded from between the dome and the clay and, when the mold base is made of metal, I preferably provide means, such as the gas burners 32, for heating the dome 10, whereby so to dry out the material which is presented to the boss or to the cloth covering the boss as to prevent its adhesion to the heated material.

In practice the mold body when assembled is placed on the base, with its lower edge supported on the springs, and its sides telescoping neatly with head 9, the mold is filled with clay, the cover plate is applied thereto and the filled mold is placed in a press, the pressure of which drives the base upwardly into the body until the plastic material is uniformly distributed and compacted throughout the entire mold for the formation of a homogeneous and perfect block. When the molding operation is completed the body may be removed from the base, carrying the block with it by reason of the engagement of the inserts 30 in the material and then the body may be separated into its component parts by loosening the nuts on the tension rods and removing the rods, leaving the side plates free for withdrawal.

While I have herein described in some detail the particular embodiment of my invention it will be seen that changes in the detail thereof might be made without departure from the spirit of my invention within the scope of the appended claims.

What I claim is:

1. In a mold of the character described, the combination of a base having an elevated box or head surmounted by a projecting dome integral with and of less diameter than the head, a body telescopically interfitting with said box and comprising separable side and end pieces, lateral flanges extending from the base and from the side pieces, guide rods carried by flanges and passing through perforations in the side flanges, and means of engagement between the side and end pieces.

2. In a mold of the character described, the combination of a base comprising a base plate, a rectangular box elevated above said plate, and a central dome projecting above said box, a body comprising side plates, end members included between said side plates each having flanges at right angles thereto for coaction with said side plates, a tension rod at each end of the body, said side plates and the flanges of the end plates being formed to receive said rods, said assembled parts telescopically interfitting with the base box, and a cover plate overlying said body.

In testimony whereof I hereunto set my hand in the presence of two witnesses.

HENRY B. PROSSER.

In the presence of—
FORÉE BAIN,
MARY F. ALLEN.

---

Copies of this patent may be obtained for five cents each, by addressing the "Commissioner of Patents, Washington, D. C."